United States Patent [19]

Bradley

[11] 4,142,626
[45] Mar. 6, 1979

[54] ACCUMULATOR FOR WOUND PAPER LOGS

[75] Inventor: John J. Bradley, Green Bay, Wis.

[73] Assignee: Paper Converting Machine Company, Green Bay, Wis.

[21] Appl. No.: 804,564

[22] Filed: Jun. 8, 1977

[51] Int. Cl.² ............................................. B65G 17/16
[52] U.S. Cl. ..................................... 198/796; 198/799
[58] Field of Search ............... 198/347, 463, 483, 484, 198/792, 793, 796, 797, 799; 214/16.1 B, 16.1 BB, 16.4 R; 226/119

[56] References Cited

U.S. PATENT DOCUMENTS

| 1,757,732 | 5/1930 | Pade | 198/483 |
|---|---|---|---|
| 2,933,176 | 4/1960 | Mansson | 198/799 |
| 4,009,814 | 3/1977 | Singh | 226/119 X |

Primary Examiner—Robert B. Reeves
Assistant Examiner—James L. Rowland
Attorney, Agent, or Firm—Tilton, Fallon, Lungmus & Chestnut

[57] ABSTRACT

An accumulator for logs of wound paper conveys logs between an input end of the accumulator and a discharge end and accommodates speed differences in the log processing equipment at the input and discharge ends. The accumulator includes stationary upper and lower sets of sprockets and movable pairs of sprockets which can move up and down between the upper and lower sets. A continuous conveyor chain extends downwardly from the upper set of sprockets to the lower set at the input end, is festooned between the lower set of sprockets and one of the sprockets of each of the movable pairs, extends upwardly to the upper set of sprockets, and is festooned between the upper set of sprockets and the other sprocket of each of the movable pairs. A plurality of log carriers are mounted on the chain for movement therewith, and logs are fed onto the carriers at the input end as the carriers are moving downwardly between the upper set of sprockets and the lower set. The logs are removed from the carriers at the discharge end as the carriers are moving substantially horizontally between a pair of horizontally spaced sprockets of the lower set.

1 Claim, 3 Drawing Figures

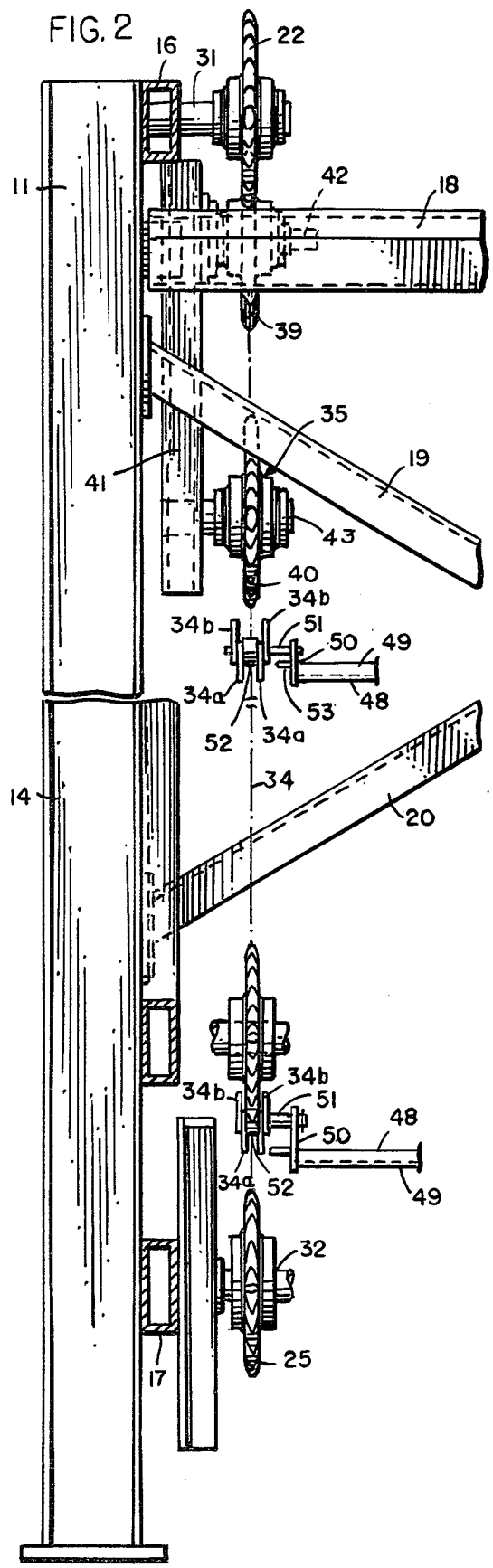
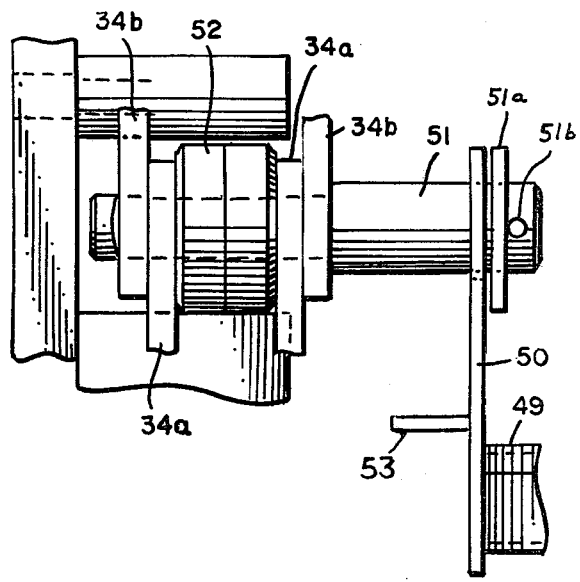

ACCUMULATOR FOR WOUND PAPER LOGS

BACKGROUND AND SUMMARY

This invention relates to an accumulator for logs of wound paper, such as toilet paper and tissue paper, and, more particularly, to a festoon accumulator which includes a downwardly travelling feed section and a horizontally travelling discharge section.

The desirability of providing an extensible web path between components of equipment in a processing line is well known in the paper processing and converting industry. Devices for extending the path of and accumulating continuous web materials are shown, for example, in U.S. Pat. Nos. 3,796,360 and 4,009,814. Interspaced accumulators accept or discharge excess material whenever there is a speed difference between processing equipment.

Both of these patents show a stationary set of rolls and a second set of rolls movable with respect to the stationary set. Movement away from the stationary set increases the web path and thus accumulates material whenever input speed exceeds output requirements for downstream processing. Whenever output requirements are greater than input, the movable set moves toward the stationary set, this action providing the differential requirement from the accumulated reserve until the reserve is depleted.

In the accumulation of continuous webs, these teachings recognize the importance of having all rolls in the movable set connected to a common member, which assures that all rolls in the movable set will move at the same velocity at the same time. This approach eliminates instantaneously higher tensions that could be introduced if the movable rolls acted independently and sequentially. Depending on tensile strength of the material handled, these patents teach both idling and driven roll sets, the latter being necessary for lightweight low tensile strength webs.

For the storage of discrete articles and, more particularly, for logs of wound material, automatic storage and discharge or surges is also desirable and can be accomplished using a different principle of operation whereby interconnected sprocket pairs move independently until limits of travel are reached, at which time movement is transferred to the next pair in sequence. It is known art for example, that a log accumulator can be used to accumulate and subsequently discharge logs when there is a variation of speed between input and output requirements. One such log accumulator utilizes movable pairs of interconnected sprockets which move up and down between upper and lower sets of stationary sprockets. These interconnected and movable sprocket pairs are arranged to be at the limit of upward travel when conveying logs between processing equipment and when input speed equals or is less than output speed. This configuration dictates the direction of chain movement around the sprockets and precludes vertical downward motion of log carriers at the input station.

One object of this invention is to provide downward motion of the receiving log carriers at the input station, this downward velocity being more nearly equal to the downward velocity component of a log being gravity fed to a carrier. With log loading from a terminal support at the input side, free fall of the log results in the downward velocity component of the log being more nearly equal to the velocity of carrier descent compared to upward carrier movement. This beneficial relationship between the movement of the log and the carrier provides higher loading rates, less space between carriers and consequent greater capacity, a minimal normal transport path, greater reliability of loading with fewer jams, and gentler handling than is obtained with known accumulators.

Another object of the invention is to provide a combination transport-accumulating system in which the discharge section is arranged horizontally to pass over a plurality of discharge points. The normal practice is to dump wound logs into one or more lanes of a log saw which then cuts the logs into discrete roll segments. In some cases, two log saws are required to handle the capacity from a processing line. The horizontal motion of the discharge section simplifies the feeding of a plurality of lanes of a single log saw and provides the capability of feeding more than one saw.

A further object of the invention is to synchronize discharge speed from the accumulator with demand from downstream equipment by providing direct drive from the equipment to the conveyor chain at the discharge end without any intermediate transport or metering devices.

DESCRIPTION OF THE DRAWING

The invention will be explained in conjunction with an illustrative embodiment shown in the accompanying drawing, in which—

FIG. 2 is an enlarged fragmentary sectional view of the log accumulator taken along the line 2—2 of FIG. 1; and FIG. 3 is an enlarged fragmentary view showing the connection between a log carrier and the chain.

DESCRIPTION OF SPECIFIC EMBODIMENT

Figure 1:
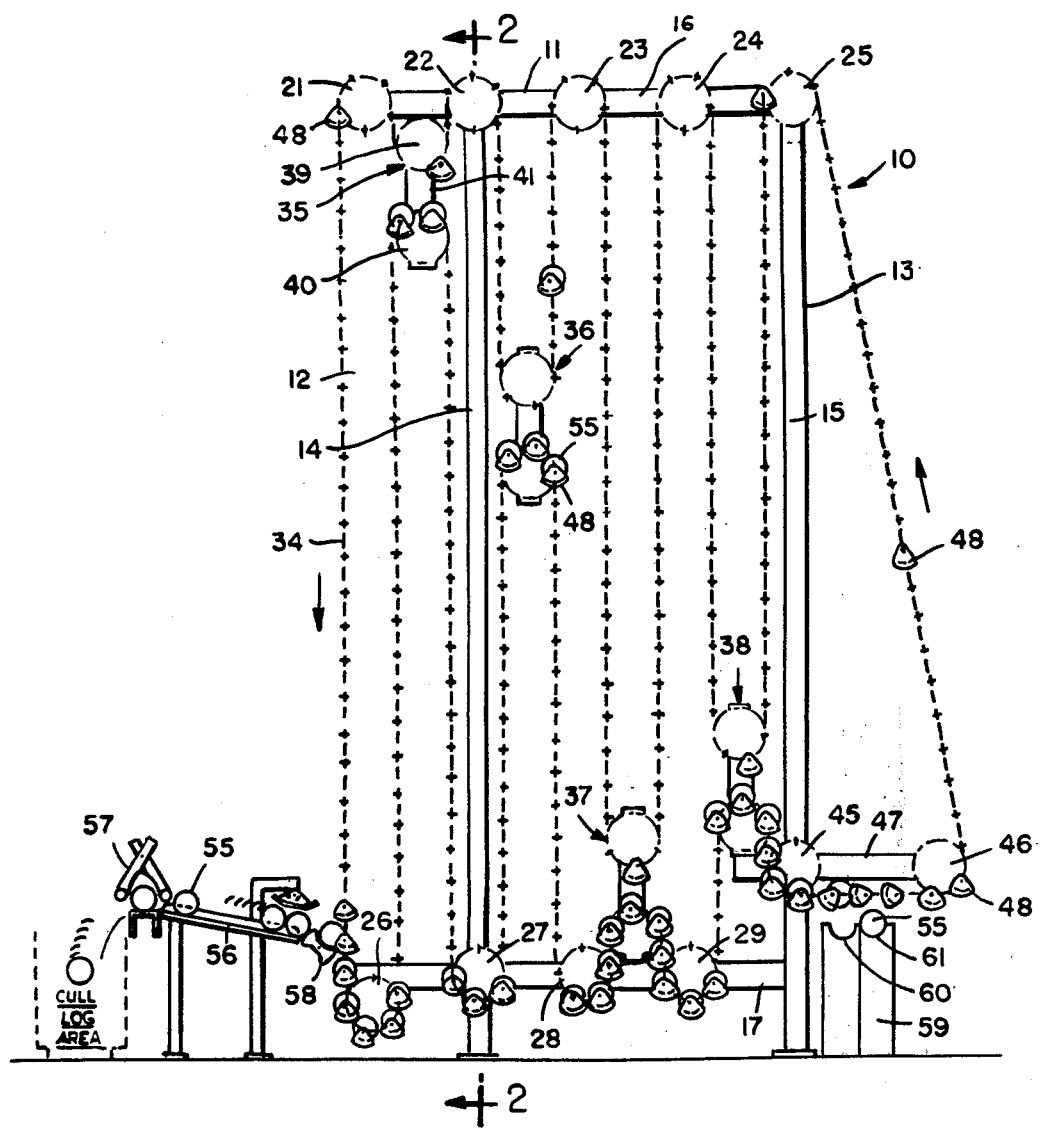
FIG. 1 is a schematic side elevational view of the invention log accumulator.

The numeral 10 designates generally a festoon-type log accumulator which includes a frame 11 having an input end 12 and a discharge end 13. The frame includes a pair of vertically extending beams 14 and 15 on each side of the frame, and upper and lower horizontally extending beams 16 and 17, respectively, which are secured to the vertical beams. Each of the vertically extending beams on each side of the frame are connected by a horizontally extending upper cross beam 18 (FIG. 2) and diagonally extending cross beams 19 and 20.

An upper set of sprockets 21, 22, 23, etc. is rotatably mounted on the upper beam 16, and a lower set of sprockets 26, 27, 28, etc. is rotatably mounted on the lower beam 17. Referring again to FIG. 2, each of the upper sprockets includes an axle 31 which is journaled in the upper beam 16, and each of the lower sprockets includes an axle 32 which is journaled in the lower beam 17. Each axle 32 extends from one side of the frame to the other and is connected to a lower sprokect on the other side of the frame so that the lower sprockets on both sides of the frame rotate together.

A conveyor chain 34 extends around the upper and lower sprockets on each side of the frame, and the chain is festooned between the upper and lower sprockets and a plurality of movable sproket pairs 35, 36, 37, etc. Each of the sprocket pairs, for example, the sprocket pair 35 shown in both FIGS. 1 and 2, includes upper and lower sprockets 39 and 40 which are rotatably mounted on a connecting bar 41. The upper and lower sprockets include axles 42 and 43, respectively, which are journaled in the connecting bar, and the connecting bar rigidly connects the two sprockets so that they move up and down together. The particular connecting bar illustrated has a rectangular tubular cross section. The upper axle 42 of each sprocket pair extends across to the other side of the frame and is connected to the upper sprocket of a movable sprocket pair on the other side so that the upper sprockets rotate together and the sprocket pairs move up and down together.

The chain 34 extends vertically downwardly from the upper sprocket 21 at the input end 21 of the frame to the lower sprocket 26 at the input end. The chain is then festooned alternately around the sprockets of the lower set and the lower sprockets of each of the movable pairs. The lower set of sprockets includes a pair of horizontally spaced sprockets 45 and 46 which are mounted on a support beam 47 which is slightly higher than the lower beam 17. The chain extends horizontally between the sprockets 45 and 46 and then upwardly to the upper sprocket 25 at the discharge end. The chain is then festooned alternately around the sprockets of the upper set and the upper sprocket of each of the movable pairs.

A plurality of log carriers 48 (see also FIG. 2) extend between the chains on both sides of the frame and are connected to the chains for movement therewith. Each of the carriers is shaped in the form of a cradle which has a curved bottom wall 49 and a pair of sector-shaped end plates 50. A support pin 51 is mounted in a spacer bushing 52 of the chain (see also FIG. 3) and extends through an opening in the end plate 50 at each end of each carrier. The bushing 52 is positioned between the ends of inner and outer chain links 34a and 34b. The opening in the end plate is larger than the diameter of the pin, and the pin is retained in the end plate by a washer 51a and a cotter pin 51b (FIG. 3). The carrier can rotate freely on the support pins, and the cradle will always hang downwardly as it is carried by the chain. A trip pin 53 extends outwardly from the end plate below the support pin for engagement with a discharge device at the discharge end of the frame. Although only a few of the carriers are shown in the drawing, the carriers are spaced equally apart along the entire length of the chain. A carrier is located at each point indicated by a cross in FIG. 1.

The log accumulator is intended for use with log processing equipment at both the input end and the discharge end of the accumulator. For example, wound paper logs 55 can be fed from a rewinder (not shown) to a roll down table 56. A culling device 57 culls unacceptable logs, and the remaining logs roll down the table to a butterfly feed mechanism 58 which drops a log into a carrier as the carrier moves downwardly past the butterfly. A saw feed conveyor 59 at the discharge end of the accumulator accepts the logs which are dumped from the carriers as they move along the horizontally extending discharge section of the accumulator between the sprockets 45 and 46. The saw feed conveyor has a pair of lanes 60 and 61 for receiving the logs and for conveying them to a log saw which cuts the logs into segments or retail-sized rolls. The foregoing processing equipment is conventional and well known and need not be described herein.

The particular log accumulator shown in the drawing is designed for use with logs of wound toilet paper. Such logs typically have a minimum length of 67½ inches, and the maximum length can be any multiple of 4½ inches, which is the length of an individual roll of toilet paper after it is sawed by the log saw.

The lower sprocket 46 at the output end of the accumulator is rotatably driven by a direct connection to the log saw which is fed by the infeed conveyor 59. The log saw is therefore fed with logs at the rate which enables the sawing operation to be performed without delays.

The lower sprocket 26 at the input end of the accumulator is rotatably driven by a motor which is driven on a signal from switches on the roll down table 56. The motor drives the sprocket 26 at a speed no slower than the maximum rate of logs coming to the accumulator. The switches on the table stop the motor when the table is empty and start the motor when logs are on the table. When the sprocket 26 is driven, an empty carrier is moved downwardly past the butterfly 58 to receive a log from the butterfly.

At times logs will be fed to the roll down table at the input end of the accumlator faster than the log saw at the output end can saw the logs. The chain will then be driven faster by the sprocket 26 than by the sprocket 46, and this will cause one of the movable sprocket pairs to move upwardly toward the upper set of sprockets, thereby increasing the length of chain between the sprocket 26 and the sprocket 46. When the movable sprocket pair reaches its upper limit of travel, another movable sprocket pair will move upwardly. The process will be repeated until all of the movable sprocket pairs are at their upper limit of travel.

When the sprockets 26 and 46 are driven at the same speed, the movable sprockets will remain stationary.

When logs are fed to the roll down table at a slower rate than the log saw can cut the logs, the sprocket 46 will be driven faster than the sprocket 26, and one of the movable sprocket pairs will move downwardly toward the lower set of sprockets to decrease the length of chain between the sprockets 26 and 46. When the sprocket pair reaches its downward limit of travel, another movable sprocket pair will move downwardly. The log saw will be fed logs at a constant rate until all of the movable pairs reach their downward limit of travel, at which time the log saw will be dependent on the rate at which logs are fed to the input end of the conveyor.

When all of the movable pairs of sprockets are at their lower limit of travel, the logs will travel the minimum distance from the roll down table 56 to the saw feed conveyor 59. The accumulator can therefore be emptied relatively fast when logs are no longer fed to the roll down table, and downstream processing equipment can be available for change over to other grades, colors, etc. without excessive delay waiting for the accumulator to become empty.

On start up of the processing equipment the movable pairs are at their lower limits of travel, and the first logs into the accumulator will travel the minimum distance before being discharged to the saw conveyor, thereby minimizing the time lapse between input and output. Current practice in the toilet paper industry dictates that loose ends of tails of wound logs should be tail sealed before accumulating or log sawing. Since adhesive to seal the tails is placed on the interface between the log and the last convolution to seal the tail end, the possibility of wicking and penetration through the outer wrap (tail) is ever present and is more pronounced as time increases. However, wicking and penetration of adhesive to the outside of the roll is less likely in a decreased time span. Accordingly, minimum time in the transport or accumulating mode is desirable to keep logs from adhering to the carriers, resulting in less damage to logs and less adhesive contamination to equipment.

Since the log carriers are moving downwardly as they pass the butterfly feed mechanism 58, the carriers and the logs are both travelling in the same direction as the logs roll over the butterfly mechanism and fall into the carriers. Accordingly, the velocity difference between the logs and the carriers is minimized, and the logs are handled safely and gently. The correlation between the velocity of the falling logs and the downwardly moving carriers also enables the carriers to be relatively closely spaced, which increases the rate at which logs can be fed to the accumulator and increases the capacity of the accumulator.

The carriers travel upwardly at the discharge end of the accumulator, and this enables the carriers to travel horizontally between the sprockets 45 and 46 at the discharge section of the transport path. A trip mechanism engages the trip pin 53 of each carrier as it moves over the saw infeed conveyor and rotates the carrier to dump the log. Because the carriers move horizontally through the discharge section, the logs can be fed to a pair of lanes of a log saw conveyor or could even be fed to a plurality of saws.

While in the foregoing specification a details description of a specific embodiment of the invention was set forth for the purpose of illustration, it will be understood that many of the details herein given may be varied considerably by those skilled in the art without departing from the spirit and scope of the invention.

I claim:

1. A log accumulator comprising:
   a frame having an input end and a discharge end,
   an upper set of sprockets rotatably mounted on the frame and spaced apart between the input end and the discharge end of the frame,
   a lower set of sprockets rotatably mounted on the frame below the upper set and spaced apart between the input end and the discharge end of the frame,
   a plurality of independently movable pairs of sprockets, each of said movable pairs comprising an upper sprocket and a lower sprocket connected together for common upward and downward movement between said upper and lower sets of sprockets,
   a continuous chain extending downwardly from the upper set of sprockets to the lower set of sprockets at the input end of the frame, then being festooned between the sprockets of said lower set and the lower sprockets of said movable pairs of sprockets, said chain passing directly between two sprockets of said lower set at the discharge end of the frame without passing over a sprocket of one of the movable pairs of sprockets to provide a substantially horizontally extending discharge section of the chain between said two sprockets, said chain then extending upwardly to said upper set of sprockets at the discharge end of said frame, and then being festooned between the sprockets of said upper set and the upper sprockets of said pairs of movable sprockets,
   means for rotating at least one of said sprockets for moving said chain around said sprockets, and
   a plurality of log carriers mounted on said chain for movement with the chain.

* * * * *